United States Patent Office 3,702,692
Patented Nov. 14, 1972

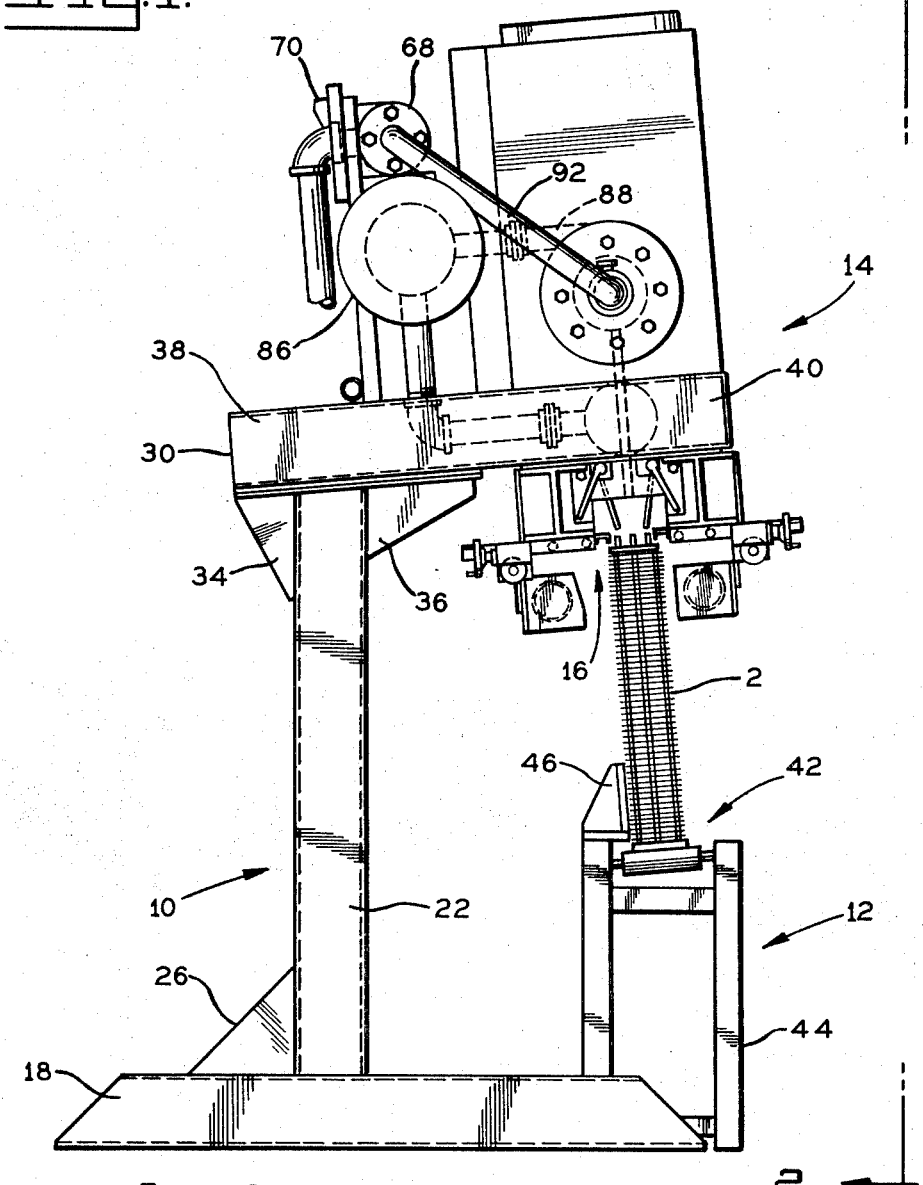
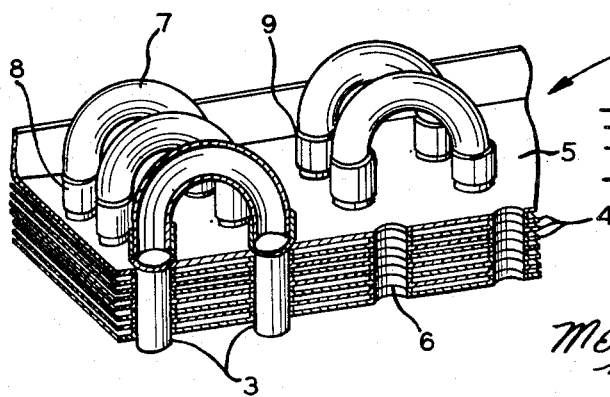

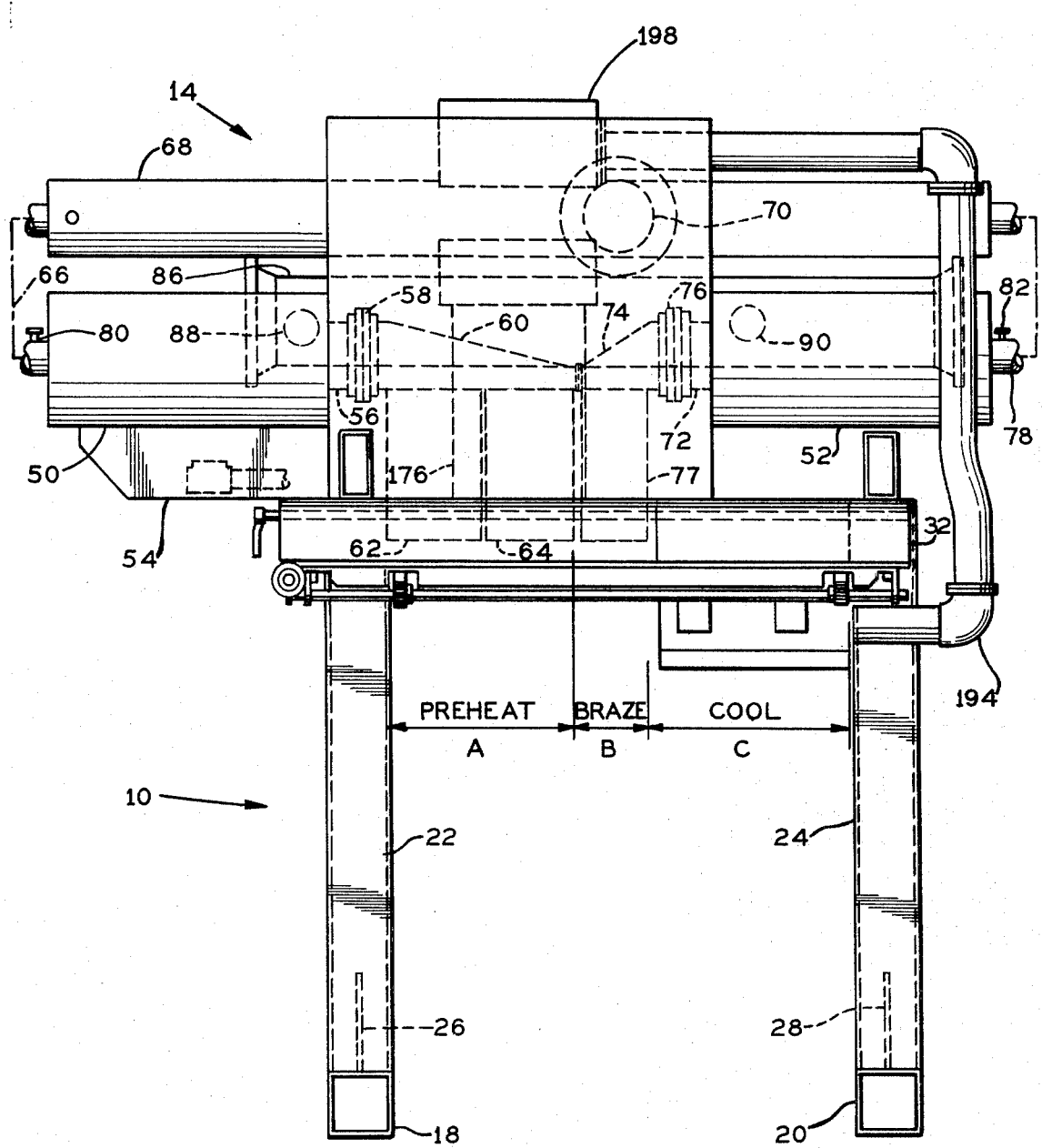

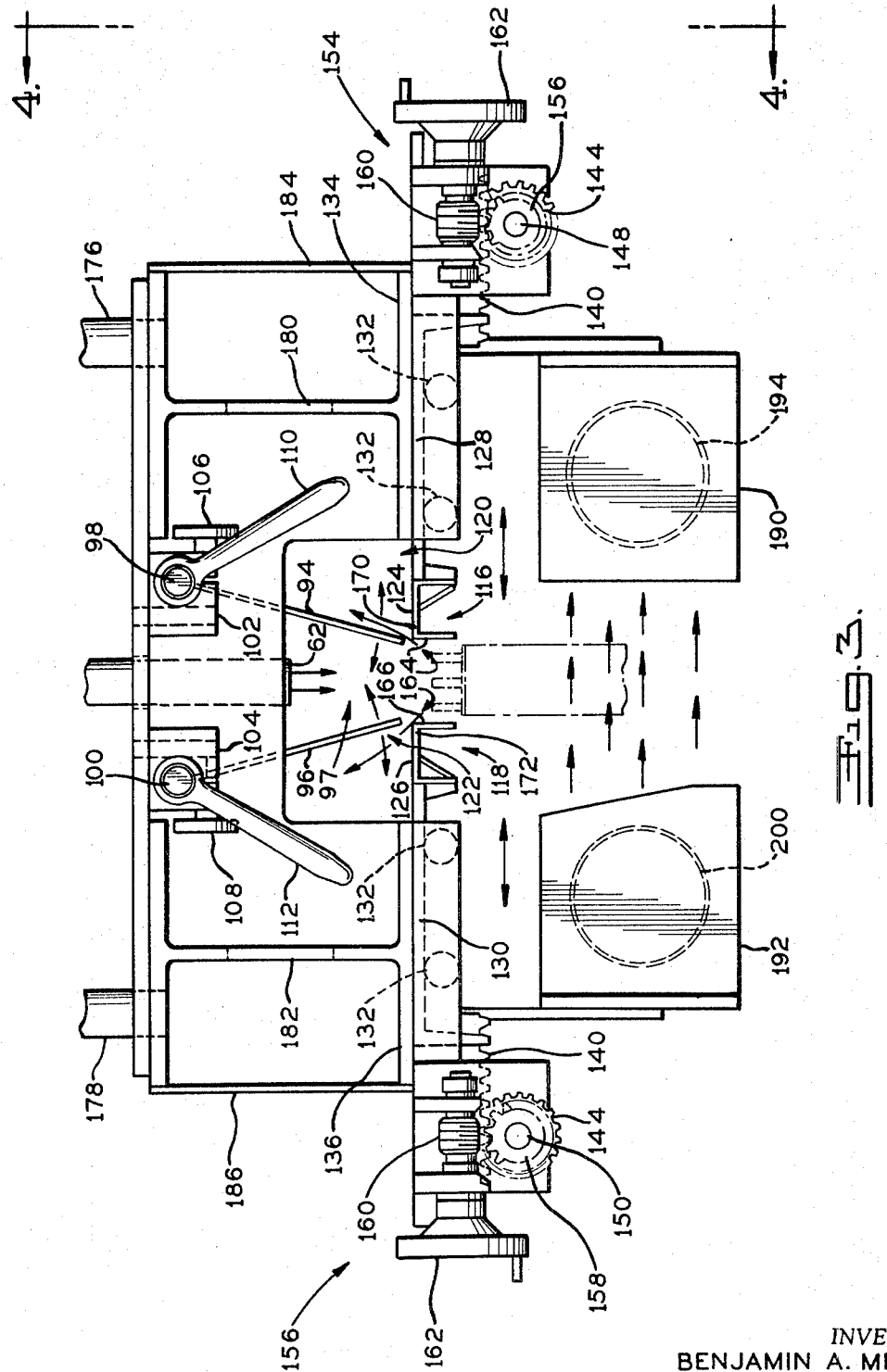

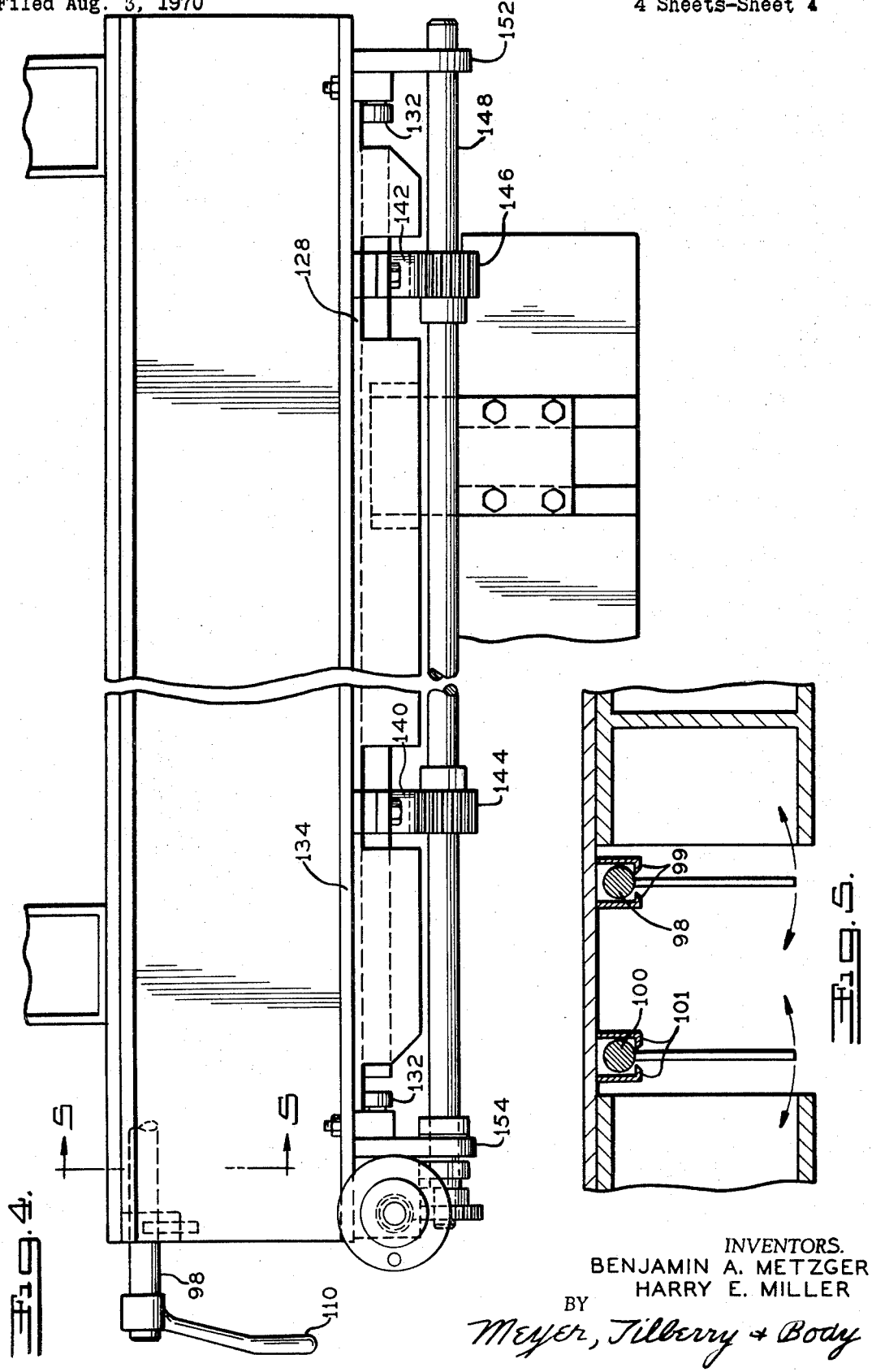

3,702,692
CONTINUOUS PROCESS BRAZING METHOD AND APPARATUS
Benjamin A. Metzger, Novelty, Ohio, and Harry E. Miller, Oxford, N.Y., assignors to Pryonics, Incorporated, Cleveland, Ohio
Filed Aug. 3, 1970, Ser. No. 60,590
Int. Cl. F27b 9/14
U.S. Cl. 263—6 R    8 Claims

ABSTRACT OF THE DISCLOSURE

Method and apparatus for brazing workpieces such as radiators and the like where the brazing temperature is in excess of 1000° F. and the temperatures used are critical. The apparatus includes means for continuously conveying the workpieces along a generally horizontal path. Positioned above the conveying means and about the path are adjustable dampers which define three side-by-side chambers that extend longitudinally of the path with the free edge of the dampers cooperating to provide adjustable openings from the chambers. The openings face the portion of the workpiece which is to be heated for brazing. Hot gases are supplied to the center chamber at temperatures suitable for preheating and brazing the workpieces. The gases are directed at high velocity against the workpiece and thereafter drawn into the two side chambers which are maintained under a negative pressure. The arrangement is such that heating of the workpieces can be closely confined to a desired portion without unnecessary and/or damaging heating of the remainder. Additionally, means are provided for rapidly and efficiently cooling the parts following the brazing operation.

---

The present invention is directed toward the brazing art and, more particularly, to a method and apparatus for continuous process brazing with hot gases.

The invention is especially suited for brazing the return bends in fin-tube heat exchangers and will be described with particular reference thereto; however, it will be appreciated the invention is capable of broader application and could be used for brazing many different products.

As used hereinafter, brazing refers to a joining operation wherein precise temperature control is important and wherein coalescence is obtained between metallic workpieces, including aluminum, by a filler material, having a melting temperature of at least above 1000° F., which has been heated to a temperature above its melting temperature but below the melting temperature of the workpieces and allowed to flow in proximity with the areas to be joined. This type of operation is to be distinguished from soldering which is conducted with tin-lead alloy filler materials having a melting temperature of less than 1000° F. and where temperature control is not important.

In our prior U.S. Pat. No. 3,426,953, we have disclosed an apparatus and process which uses hot, relatively high velocity, inert gases for brazing. The particular structure disclosed in the patent is arranged to direct various temperature gases sequentially against the joint to be brazed.

The gas temperatures are preferably regulated to preheat the entire joint to a temperature just below the melting point of the brazing alloys and, thereafter, to heat it above the melting point and subsequently cool it.

As can be appreciated, the entire joint must be relatively uniformly raised at least to the alloy melting temperature. It is important however, that no section of the joint be heated so hot in the brazing of copper that the brazing alloy boils or becomes sufficiently liquid to run out of the joint, or in the case of aluminum, that the aluminum does not melt. To accomplish this it is important that the temperature of the gas be closely controlled and, also, that it be supplied to the joint extremely uniformly. In brazing aluminum, it is necessary to maintain a ±10° F. temperature control to insure reliable joints. Further, the melting temperature of the required brazing alloys for aluminum are generally only about 50° F. below the melting temperature of aluminum itself.

When brazing the bell and spigot connections between the tubes and return bends of finned tube heat exchangers, provision must be made to assure that the thin fins are not heated to a point such as to change their metallurgical properties. This presents particular problems and, at times, has resulted in the heat exchanger tube sheet design being controlled by the brazing apparatus.

The present invention provides an apparatus which overcomes the above problems and allows rapid, controlled brazing of a variety of types and styles of heat exchangers, as well as other types of products.

In accordance with one aspect of the invention a brazing method is provided which includes the steps of:

(a) Continuously moving workpieces having brazing alloys in position thereon along a path;

(b) Throughout a first portion of the path directing high velocity gases at a first controlled temperature against the portions of the workpieces which are to be brazed to bring their temperature close to the melting point of the brazing material;

(c) Throughout a second portion of the path directing relatively high velocity gases at a second but hotter controlled temperature against the portions of the workpieces to be brazed to bring the temperature at least to the melting point of the brazing material; and (d) Adjacent said portion of the workpieces which are to be brazed and on both sides of the points of applications of the hot gases, withdrawing the hot gases and exhausting same.

In accordance with another aspect of the invention there is provided apparatus including conveyor means for continuously conveying the parts to be brazed along a path with the portion which is to be brazed extending from the conveying means. Mounted adjacent the conveyor means are first means which define a narrow outlet extending substantially the length of the path. Second means are positioned adjacent the first means to define inlets on opposite sides of the outlet throughout the length of the outlet. Additionally, means are provided to supply hot gases at accurately controlled temperatures to the outlet in order to be directed therefrom against the workpieces. Exhaust means are also connected to the inlets to continuously exhaust the hot gases.

As can be seen, the arrangement of the gas supply and exhaust, produces a localized heating of the parts without escape of exhaust gases to the ambient atmosphere.

In accordance with a more specific aspect of the invention, the first and second means comprises baffle members provided with adjusting means to permit the inlets and outlets to be varied to control the direction and velocity of the hot gases.

In accordance with another aspect of the invention, there are means for providing varying temperatures of hot gases at spaced zones longitudinally of the outlet.

Accordingly, a primary object of the invention is the provision of a continuous process hot gas brazing method apparatus which is capable of closely controlled and localized heating of parts.

Another object is the provision of a brazing method and apparatus in which the hot gases used for heating the parts can be regulated to extremely close temperatures and directed to limited areas of the parts being heated.

Another object is the provision of a brazing method and apparatus in which copper tubes and return bends may be joined together without melting aluminum fins which have previously been mounted on the tubes.

A further object of the invention is the provision of an apparatus of the type described wherein cooling of the parts following brazing is accomplished rapidly and in the same apparatus.

Yet another object is the provision of an apparatus particularly suited for brazing fin tube radiators of substantially any type and size with a minimum of modifications to the apparatus.

A still further object is the provision of an apparatus which is easy to operate and maintain while being relatively simple and inexpensive to construct.

The invention may take physical form in certain parts and arrangements of parts, a preferred embodiment of which will be described in detail in this specification and illustrated in the accompanying drawings which form a part hereof and wherein:

FIG. 1 is an end elevation of a continuous process brazing apparatus formed in accordance with the preferred embodiment of the invention;

FIG. 2 is a side elevation taken on line 2—2 of FIG. 1;

FIG. 3 is an enlarged view looking into the end of the FIG. 1 apparatus;

FIG. 4 is a side elevation taken on line 4—4 of FIG. 3;

FIG. 5 is a view taken on line 5—5 of FIG. 4; and

FIG. 6 is a fragmentary, prospective view of a heat exchanger of the type for which the present invention is particularly adapted to be employed.

Merely by way of example and with reference to FIG. 6, a typical workpiece to which this invention is directed comprises radiator 2 of the fin tube type which is normally formed of a plurality of spaced apart, parallel-extending tubes 3 having thin, closely spaced, aluminum fins 4 carried thereon. These tubes are mounted to header or tube sheet members 5 with the aluminum fins having apertures 6 which receive and tightly grip the tubes. The ends of the tubes are connected in fluid flow relationship by U-shaped, return bends 7 and the joint 8 between each of these return bends and the tubes is of the bell and spigot type. Prior to the time the radiators are brought to the brazing apparatus, a ring 9 of brazing alloy is positioned about the end of each bell and during passage through the apparatus, ring 9 is heated to its melting point to melt and flow into the joint. Tubes 3 and return bends 8 may be made from copper or aluminum and rings 9 are made from an appropriate brazing alloy.

Referring now to FIGS. 1 and 2, it will be seen that the embodiment shown includes a main support frame assembly 10 which extends above a conveyor or work feeding assembly 12 and carries the brazing assembly 14. Broadly, the apparatus is arranged so that the workpieces, such as the radiators hereinbefore described, are conveyed along conveyor 12 with return bends 7 facing upward and forming a return bend area 16. Area 16 is subjected to the heating required to properly braze the return bend to the vertical tubes.

Referring to FIG. 2, it will be seen that the apparatus is arranged so that as the radiators are conveyed therethrough they are passed sequentially through a preheating zone, a brazing zone, and a cooling zone so that in a single pass through the unit the joint is brazed and cooled.

Although the subject invention could have a variety of specific orientations and embodiments, the preferred embodiment is arranged so that the brazing takes place with the radiators in a nearly vertical position. Specifically, the frame assembly 10 is shown as including two vertical frame sections each comprised of a pair of spaced, horizontal base frame members 18 and 20. These members are shown as simple box beams but could be of any particular type. Extending vertically upward therefrom are two support beams 22 and 24 which are welded to the horizontal members 18 and 20. Brackets 26 and 28 are shown positioned at the juncture between the beams 22, 18 and 24, 20 respectively.

Connected to the vertically extending supports 22, 24 are a second pair of box beams 30 and 32 with triangular reinforcing plates 34 and 36 welded at the juncture between the vertical beams and the beams 30, 32. The two vertical frame sections are interconnected by horizontally extending beams or frame members 38 and 40 which extend between the members 32, 30 and are welded thereto at opposite ends.

The upper beams 30, 32, and the brazing assembly 14 supported thereon, are preferably tilted at a small angle, for example 5°, from a true horizontal-vertical position. This slight tilted position eliminates the need for any workpiece holding or gripping means since the inclined position of the apparatus allows the workpieces to simply rest against the apparatus as they pass therethrough on conveyor 12. The conveyor 12 is similarly inclined and, as shown, includes a continuous belt-type conveyor assembly 42 which is arranged to convey the radiators to be brazed along a generally horizontal path beneath the brazing assembly 14 and properly oriented relative thereto.

Although conveyor 12 could be of many types, it is shown as including a support frame 44 on which is mounted a conventional roll and belt assembly 42. The belt assembly 42 is inclined at substantially the same angle as the brazing assembly 14. Additionally, a guide plate 46 extends the length of the conveyor belt 42. Again, the inclined relationship of the conveyor and the brazing assembly permits the workpieces, such as radiator 2, to be simply set on the conveyor belt at one end and conveyed through the brazing apparatus without the need for workpiece holding means.

Of primary importance to the invention is the arrangement of brazing assembly 14. According to the invention, the brazing assembly 14 is arranged so that the jets of hot gases impinge only on the joint portions of the radiators and the gases are then quickly exhausted. The area of heating is thus closely confined. As can be appreciated, this eliminates any possibility of damage to the closely spaced aluminum fins by overheating. Additionally, the heating arrangement is such that hot gases do not escape into the ambient atmosphere about the machine.

The subject invention is arranged so that as a radiator passes through the brazing apparatus 14, it is first passed through a section A where it is preheated to a temperature a few degrees below the melting point of the brazing rings 9. The workpiece next passes through the brazing section B located immediately adjacent section A where the joints are quickly heated to a point above the brazing temperature so that the rings 9 of brazing alloy melt and flow into the joints by the combination of gravity and capillary action. Thereafter, the joints are cooled in the cooling section C immediately adjacent section B.

Although the means used for supplying the heated gas to the preheating and grazing sections could vary widely, in the subject embodiment they comprise two horizontally positioned burners 50 and 52. Burner 50 is supported on the left-hand side of the frame 10 as viewed in FIG. 2 by outwardly extending bracket plates 54. Burner 52 is similarly supported at the opposite end of the frame. As shown, burner 50 is positioned with its outlet 56 extending horizontally toward the center of the machine. The outlet 56 is connected through suitable joints 58 with a conically shaped transition piece 60. Extending downwardly from the bottom wall of the transition piece 60 are a pair of outlet ducts 62, 64. As can be seen from FIG. 3, the outlet ducts 62, 64 are relatively narrow compared with their width and arranged to direct the hot gases vertically downward toward the radiators. The distribution and exhaustion of the hot gases forms an important facet of the invention and will hereafter be described in detail.

Referring again to the FIG. 2, it will be seen that the air for the burner is supplied through a line 66 from a main air supply header 68 extending horizontally the length of the apparatus. Air under substantial pressure is supplied to the header 68 through an inlet 70 connected, for example, to a blower fan not shown.

The burner 52 is constructed similarly to burner 50 but, as shown in FIG. 2, is positioned with its outlet 72 extending directly toward the outlet of burner 50. A smaller transition piece 74 is connected through a suitable joint 76 with the outlet 72. Extending downwardly from the transition piece 74 is an exhaust duct 77 having a configuration generally the same as the ducts 62, 64. The burner 52 is, of course, arranged to exhaust gases at a somewhat higher temperature than burner 50. As shown, the duct 77 exhausts directly downwardly toward the brazing zone against the radiators passing thereunder.

Air required for combustion in burner 52 is supplied from header 68 by a line 78. Gas for burners 50 and 52 is supplied through connections 80, 82 respectively connected to a suitable source of gas not shown. These burners supply gas at a temperature on the order of 3000° F.

Because the burners are required to maintain their exhaust temperatures at extremely close levels, means are provided for quickly varying the supply of gas and air to burners 50, 52. These means may be any convenient means such as, for example, adjustable valve members (not shown).

It is also necessary to maintain the discharge velocities of the gases from outlet ducts 62, 64 of burner 50 and exhaust duct 77 of burner 52 at a constant level. This constant velocity insures proper preheating and brazing treatment of the joints as the workpieces are transported on conveyor 12 beneath the outlet ducts by allowing the conveyor speed and gas velocity flow to be properly co-ordinated. In the preferred embodiment under discussion, the means provided comprises a main, large diameter header 86 which extends parallel to the air header 68. Header 86 is connected to a source of reducing flue gases (not shown). Burners 50, 52 are connected with header 86 by pipes 88, 90 respectively. Fixed orifice plates 92 in pipes 88, 90 direct the flow of this flue gas.

In operation and as hereinabove disclosed, burners 50, 52 supply gas at a temperature on the order of 3000° F. The temperature of the flue gas entering burner 50, 52 through pipes 88, 90 respectively, is cooled by means not shown, and which do not form a part of this invention, to a temperature on the order of 100° F. The resultant of combining these two gases is gas issuing from ducts 62, 64 and 77 of a temperature on the order of approximately 1500° F. From this temperature range, it is relatively easy to regulate the percentage of gas and air supplied to burners 50, 52 in order to obtain the desired temperature levels for gas issuing from ducts 62, 64 and 77. That is, for ducts 62, 64 to a temperature slightly below the melting temperature of brazing alloy rings 9 and for duct 77 to a temperature above the melting temperature of the rings but below the melting temperature of the tube and return bend materials.

Of primary importance to the invention is means used for controlling the flow of hot gases to the workpieces in a manner which closely confines the area of heating as well as eliminating escape of the hot gases to the surrounding atmosphere. As can be appreciated, it is highly preferable that the apparatus be capable of brazing many types of radiators having differing tube sheet arrangements. The subject invention accomplishes this with means which provide an adjustable air curtain about the head end of the radiators as they pass through the apparatus. The specific structure could take many forms within the scope of the invention; however, the preferred embodiment is as best shown in FIGS. 3 and 4. Referring in particular to FIG. 3 it will be noted that extending generally downwardly on each side of the outlet ducts 62, 64 and 77 are a pair of dampers or baffle means 94 and 96. Both baffles 94 and 96 extend throughout the length of the apparatus adjacent all three zones A, B and C. The baffles are arranged so that they define a longitudinally extending chamber 97. The lower free edges of the baffles provide a longitudinal outlet which directs the heating gases directly downwardly against the end of the radiator to produce a scrubbing action and rapid heating.

The apparatus can be used for varying width radiators and for this reason the dampers 96 are preferably adjustably mounted to vary the spacing at their free or discharge ends. Additionally, the mounting arrangement preferably allows control over the direction of gas discharged. The adjustable mounting means for the dampers could take many forms but in the preferred embodiment comprise longitudinal shafts 98 and 100 respectively which extend through the length of the machine and are mounted in bearing blocks 102 and 104, respectively. The bearing blocks 102 and 104 are merely split blocks which can be clamped through the clamp studs 106 and 108 to vary the frictional engagement with the shafts 98 and 100. As best shown in FIG. 5, shafts 98 and 100 are carried by longitudinally extending pairs of brackets 99 and 101. The brackets 99 and 101 loosely engage the outer surfaces of the shafts throughout their length and provide a relatively tight seal for chamber 97. Mounted at the outer ends of the shafts 98 and 100 are adjusting handles 110 and 112. As can be appreciated, by releasing the clamp nuts 106 and 108 the clampers can be pivoted to vary their spacing. Additionally, the direction of the gases flowing from the chamber can be regulated somewhat by varying the angle of the dampers.

A second pair damper or baffle means 116 and 118 are positioned to extend generally horizontally throughout the unit at a location above the path of movement of the parts and adjacent the portion of the parts which is being brazed. The baffles or damper members 116 and 118 cooperate with the baffle members 94, 96 respectively to define two longitudinal exhaust chambers 120 and 122 respectively, which are on opposite sides of the hot gas chamber 97. The baffle members 116 and 118 can have a variety of configurations but, in the embodiment under consideration, they are shown as comprising a pair of channel members 124 and 126 which are preferably releasably connected to the outer ends of plate members 128 and 130. Plate members 128 and 130 extend throughout the length of the path of movement and define a portion of the respective chambers 120 and 122.

Referring in particular to FIGS. 3 and 4, it will be seen that the baffle members 116 and 118 are mounted for horizontal adjustment so that the spacing between their outer free ends can be varied depending upon the width of the portion of the part being heated and brazed as shown in FIG. 4, the opposite ends of the plate members 128 and 130 are supported by pairs of rollers 132 which are carried by bracket plates connected to the horizontally extending frame member 134 and 136, respectively. This permits the plate members to be moved selectively in a horizontal direction relative to the path of movement of the parts.

The means for adjusting the members 128 and 130 comprise rack gears 140 and 142 which are bolted to the underside of each of the plates 128 and 130. The rack gears are driven through pinion gears 144 and 146 carried on and keyed to horizontally extending shafts 148 and 150. As can be seen in FIG. 4, the shaft 148 is carried in bearing plates 152 and 154 which depend from the underside of member 134. The shaft 150 is similarly mounted from bearing plates connected to the underside of frame member 136. Each of the shafts 148 and 150 are driven by gear assemblies 154 and 156 respectively. The two assemblies are identical and comprise a first gear 158 keyed to the outer end of each of the shafts and driven through a worm gear 160 carried on a horizontally extending shaft supported from suitable brackets extending outwardly from brackets 154. Handwheels 162 are connected to the outer ends of the worm gear shaft for adjusting the horizontal position of the damper members 118 and 116.

Referring to FIG. 3 it can be seen that by adjusting the dampers 94, 96, 116 and 118 the tube sheet ends of the radiators 16 are closely enclosed throughout the path of travel through the apparatus. The hot gases exhausted from between the lower ends of dampers 94 and 96 are caused to impinge directly against the tube sheet portion producing rapid, localized heating.

In the embodiment under consideration, the baffles or dampers 116 and 118 each have downwardly depending simulator plates 164 and 166 respectively which further serves to confine or enclose the hot gases relative to the end of the radiator. It should be understood that depending upon the configuration of the workpieces the configuration of members 124 and 126 can be varied.

In addition, to maintain the hot gases closely confined, means are provided for maintaining a negative pressure within chambers 120 and 122. This produces a slight flow of ambient air (as shown by the arrows) upwardly about the radiator and through the space between the tube sheet and the simulator plates 164 and 166 into the chambers 120 and 122. Hence, the hot gases are prevented from escaping to the surrounding atmosphere and heating additional portions of the parts. By adjusting the relative positions of the baffles 94, 116 and 96, 118, the space between the free ends of the respective baffles can be adjusted to vary the flow and pressure across them. Additionally, and in accordance with a limited aspect of the invention, small openings 170 are formed through the horizontal portion of member 124 while similar openings 172 are formed through the horizontal portion of member 126. Thus, should any hot gases escape from between the lower edges of members 164 and 166, they are drawn upwardly through the openings 170, 172.

The means for maintaining negative pressures within the chambers 120 and 126 include exhaust ducts 176 and 178 (see FIG. 3) which extends downwardly through the upper outermost flange of the frame members 134 and 136 respectively. The frame members 134 and 136 are large H beams positioned with their web extending vertically and suitable openings 180 and 182 formed through the web at spaced positions longitudinally of the frames. Cover plates 184 and 186 enclose the outer ends of the members to provide an enclosed plenum or exhaust chamber which is connected with the chambers 120 and 122 through the openings 180 and 182. The ends of the chambers are suitably enclosed by transversely extending plate members. The exhaust ducts 176 and 178 extend upwardly to a plenum chamber not shown which is suitably connected to an exhaust fan.

It is to be understood that it is possible to operate the apparatus satisfactorily when the above-described negative pressure is not required to be utilized. This may be accomplished by including workpiece grippers on conveyor 12 in order that the workpieces will be held securely in place thereon. Additionally, the conveyor must be adjusted so that a tight seal is obtained between the workpieces and chamber 97 to prevent exhaust gas leakage to the outside atmosphere. Exhaust gases will then enter chambers 120 and 122 under positive pressure only. An alternative to this which does not require the tight seal is to provide positive pressure on the top of the tube sheet and an almost neutral pressure point between the juncture of baffles 94, 96 and simulative plates 164, 166. The velocity of movement of hot gases across the tube sheet and the exhaust rate therefrom is controlled by varying the distance between baffle 94 and simulative plate 164 and baffle 96 and simulated plate 166. A flow of air directed upwardly along the sides of radiator 16 prevents the uppermost fins from becoming overheated during the apparatus cycle.

As can be appreciated, as the parts pass through the pre-heat and brazing zones A and B respectively as shown in FIG. 2 they are first raised to a temperature closely below the melting temperature of the brazing alloy and thereafter quickly brought to points slightly above the alloy melting temperature. Following this, they are passed through the cooling zones C where the alloy is caused to solidify and the parts cooled. The cooling zone C is arranged so that a cool gas is blown down against the head end of the radiators in the same manner in which the hot gas is supplied. That is, cool gas is supplied from the header 86 to a position between damper members 94 and 96. This cool gas may be of the type classified as inert or reducing or may be merely air. Additionally, a vacuum is maintained within the right-hand end of the chambers 120 and 122 to withdraw the cooling gases so they do not escape into the surrounding atmosphere. In addition, the subject invention provides a pair of chambers 190 and 192 which extend beneath the frame members 134 and 136 throughout the length of the cooling gas supply ducts respectively. The rectangular exhaust duct member 190 is connected through a pipe or duct 194 with the exhaust plenum 198. The supply duct 192 is similarly connected through a pipe member 200 with a supply of gas at the ambient temperature. In the preferred embodiment, air is the gas generally used although it is to be understood that pipe member 200 could be connected to flue gas header 86 for use of flue gas. The gas supplied to the duct 192 is directed in the manner shown by the arrows in FIG. 3 to pass through the body of the radiator and into the exhaust duct 190. This causes a cooling of the radiator by making use of the natural heat exchange function of the radiator.

Having thus described our invention, we claim:

1. Apparatus for continuously brazing workpieces and using convection type heating, said apparatus comprising:
conveyor means for continuously moving the portion of each of said workpieces to be brazed along a predetermined path;
first means mounted to define a hot gas outlet closely spaced to and extending along at least a portion of the length of the path;
second means positioned adjacent the first means to define at least one hot gas inlet extending substantially coextensive with the length of the outlet; means for supplying hot gases at high velocity to said outlet to be directed therefrom against said portion of said workpieces to effect desired heating thereof; and
exhaust means for withdrawing and exhausting said hot gases through said inlet from proximity with said portion.

2. The apparatus as defined in claim 1 including means to supply gases to said outlet at a first temperature throughout a first portion of the path and at a second higher temperature throughout a second portion of the path.

3. The apparatus as defined in claim 2 including means for supplying cool gases against the workpieces throughout a third portion of the path.

4. The apparatus as defined in claim 1 wherein said first means are adjustable to vary the width of said outlet.

5. The apparatus as defined in claim 1 wherein said second means are adjustable to vary the width and position of said at least one inlet.

6. The apparatus as defined in claim 1 wherein said first and second means include baffle members.

7. The apparatus as defined in claim 6 wherein said baffle members are adjustable and extend substantially the length of said first and second means.

8. The apparatus as defined in claim 1 wherein said first and second means include adjusting means to vary their position relative to the path.

References Cited

UNITED STATES PATENTS 3,567,199   3/1971   Holden _____ 263—6 R

JOHN J. CAMBY, Primary Examiner